Nov. 10, 1936.    H. A. ROSE    2,060,471
ELECTRIC CURRENT CONVERSION SYSTEM
Filed Jan. 16, 1936    3 Sheets-Sheet 1

WITNESSES:
Michael Stark
S. A. Strickleff

INVENTOR
Herbert A. Rose.
BY
O. B. Buchanan
ATTORNEY

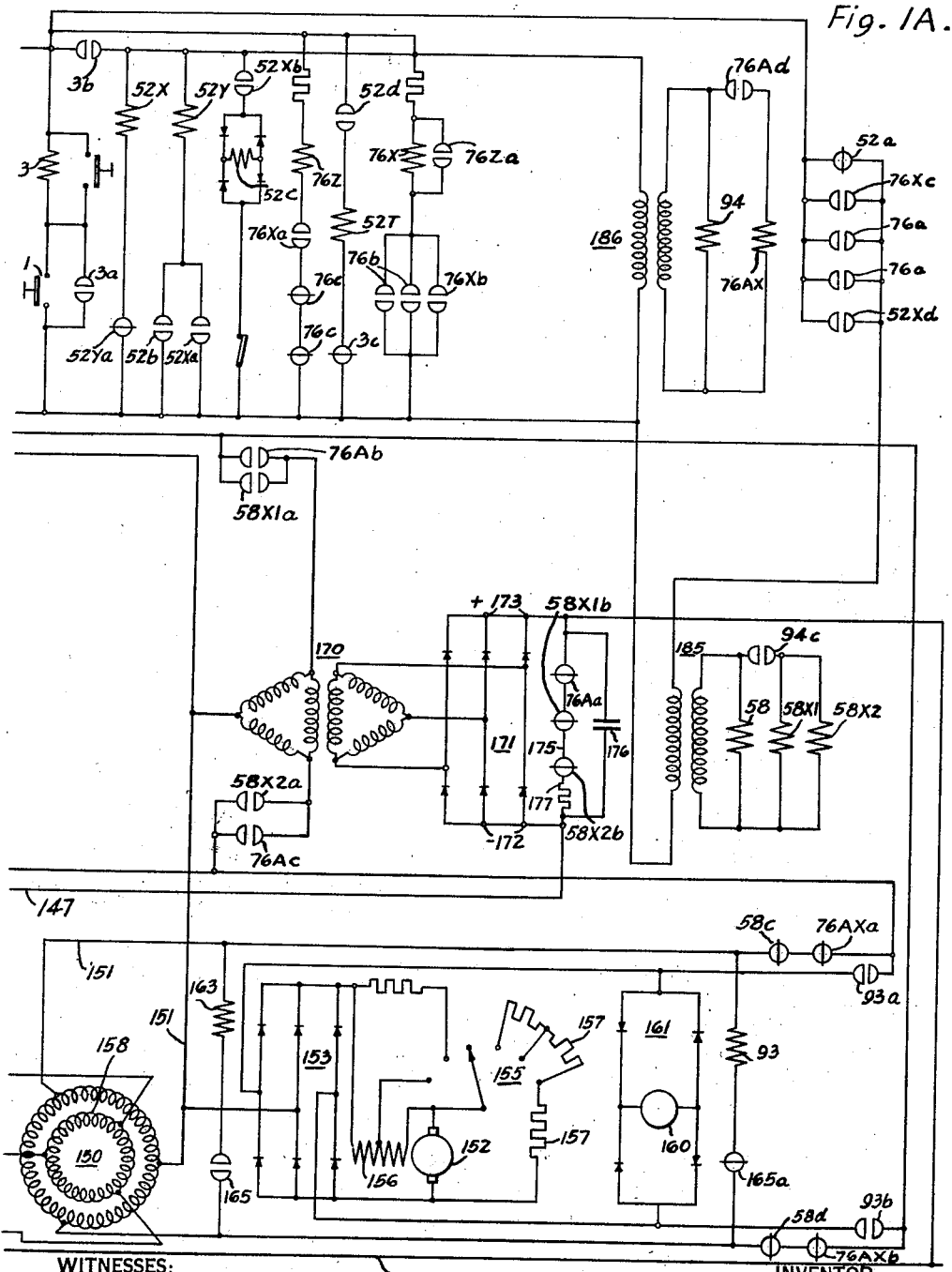

Patented Nov. 10, 1936

2,060,471

UNITED STATES PATENT OFFICE 2,060,471

ELECTRIC CURRENT CONVERSION SYSTEM

Herbert A. Rose, Pittsburgh, Pa., assignor to Westinghouse Electric & Manufacturing Company, East Pittsburgh, Pa., a corporation of Pennsylvania Application January 16, 1936, Serial No. 59,401

11 Claims. (Cl. 175—363)

My invention relates to an electric current conversion system and particularly for a control system for providing automatic starting, stopping, and fault-clearing of vapor-electric converters.

In the operation of vapor-electric converters, it is frequently desirable to provide a control system by which the conversion system may be automatically started and controlled either in response to the manual operation or any suitable indication. It is preferable that such a starting system should establish the initial control conditions prior to application of potential to the anodes of the converter, or at least at substantially the same time.

It is also desirable to provide a control system which will change the control characteristics of the converter so that undesirable transients will be eliminated without seriously interrupting service by the converter.

It is also desirable in many applications to provide a conversion system in which the output voltage will be gradually advanced to the desired operating potential over a predetermined time interval.

A control system according to my invention provides means for applying the control potential to the control electrodes, such as grids, in the converter, initiating and maintaining the cathode spot in the converter, and closing circuit breakers to apply potential to the anodes of the converter.

My control system also provides relay trains responsive to predetermined abnormal operating conditions of the converter for momentarily or permanently applying blocking potentials to snuff out or correct the abnormal operating conditions, and after termination of the abnormal condition restore the converter to use or permanently disconnect it depending upon the nature and frequency of the fault.

Figure 1:
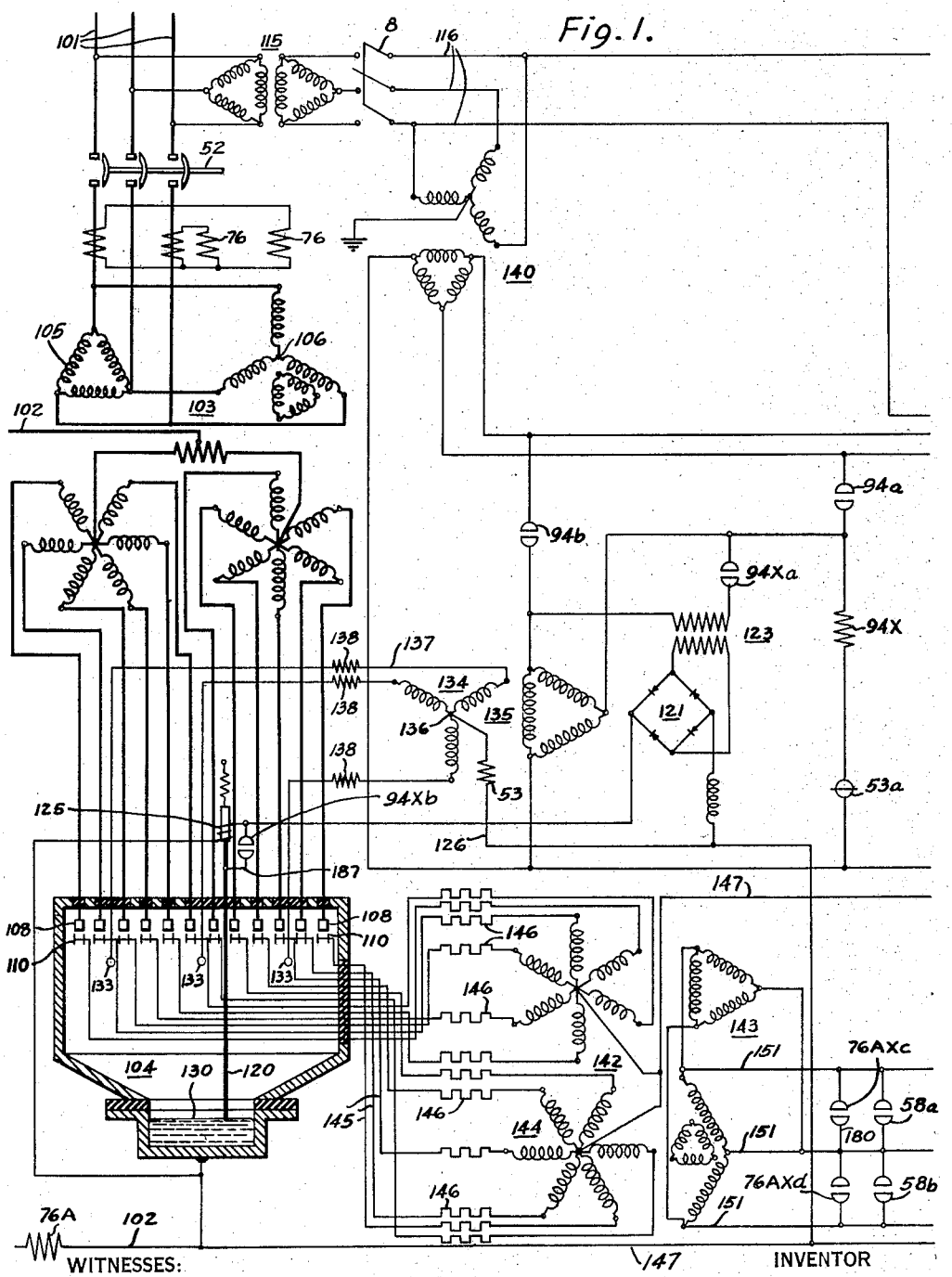
Figure 2:
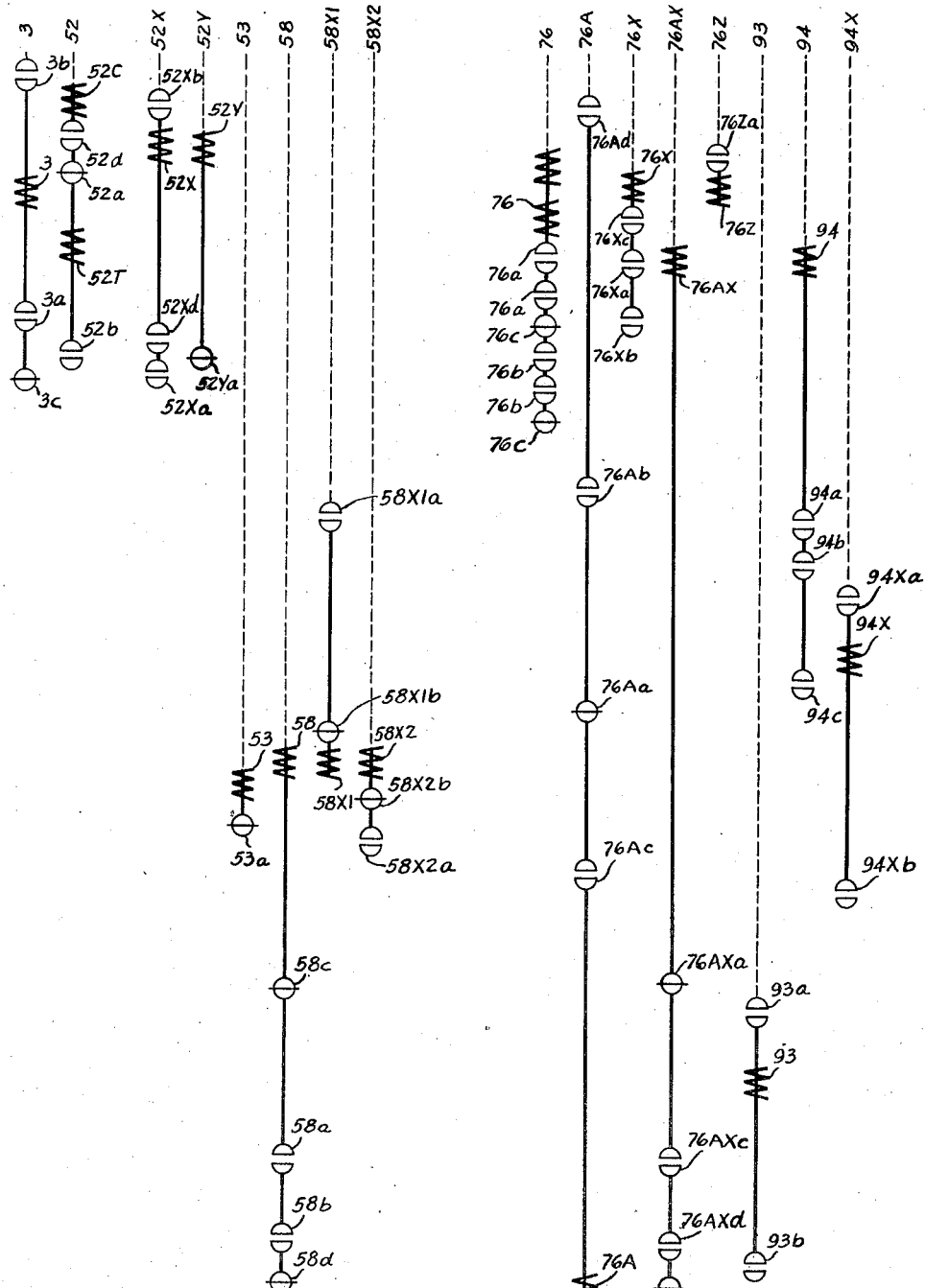

Other objects and advantages of my invention will be apparent from the following detailed description taken in conjunction with the accompanying drawings, in which Figures 1 and 1A are diagrammatic illustrations of a control system according to my invention, and Fig. 2 is a diagrammatical illustration of the coils and contacts of Figs. 1 and 1A.

The illustrated embodiment of my invention comprises an alternating-current circuit 101, a direct-current circuit 102, these circuits being interconnected by means of a suitable transformer 103, and a vapor-electric valve type converter 104 for controlling the flow of current between the circuits. For purposes of illustration, I have shown the alternating-current circuit 101 as three-phase and connecting transformer 103 as double six-phase diametrical with interphase, the primaries 105—106 being parallel delta Y connections, with two six-phase diametrical secondaries providing twelve secondary terminals which are connected to the twelve valves 108 of the converter 104. Each valve 108 of the converter 104 is provided with a suitable control grid 110 to which control potentials are supplied as presently to be described. A suitable circuit breaker 52 is provided in one or both of the circuits connected to the converter.

For purposes of illustration, I have shown the conversion system as converting alternating-current potential to direct-current potential, and accordingly I have provided a control circuit breaker 52 in the alternating-current circuit 101. For controlling the operation of the converter 104, I have provided a suitable source of control potential, which may conveniently be an operating transformer 115, supplied with energy from the alternating-current circuit 101. A suitable circuit breaker device 8 is provided for connecting the source of potential 115 to the control circuit 116 presently to be described.

The excitation system, according to my invention, comprises a direct-current starting electrode 120 which is supplied with energy from a suitable rectifying device 121 connected to the secondary winding of a starting transformer 122. Also connected to the terminals of the starting rectifier 121 is a control coil 125 for operating the starting electrode 120. A return circuit 126 for the starting electrode 120 is provided from the cathode 130 of the converter 104 to the negative terminal of the starting rectifier 121. I also provide three keep-alive electrodes 133 which are supplied with energy from a Y-connected secondary 134 of a keep-alive transformer 135, the neutral point 136 of which is connected to the return circuit 126 from the cathode of the converter 104. Each of the keep-alive anode leads 137 is provided with a suitable resistor element 138, while the return lead 126 is of relatively low resistance. As a result of this resistance connection, each of the keep-alive anodes 133 is operative for substantially 180 electrical degrees and delivers a current wave of substantially sine wave form. Thus I am enabled to secure an exciting current of substantially constant value having a characteristic six-phase ripple.

The entire keep-alive system is connected preferably by means of an insulating transformer 140 to the control circuit 116, and suitable contactors or relays, the use of which is to be presently described, are utilized for the application of current for the starting and keep-alive transformers 123 and 135.

The control potential for the control electrodes 110 of the converter 104 is provided by a suitable impulsing or control transformer 142 illustrated as having delta Y parallel primary windings 143 and double six-phase diametrical secondary windings 144 without interphase. Each of the control connections 145 between the terminals of the control transformer 142 and the control electrodes 110 is provided with a suitable resistor 146 while the return lead 147 from the cathode 130 of the converter 104 to the star points of the six-phase diametrical windings 144 is of relatively low resistance so that the control potential is applied to the control electrodes 110 for a period of substantially 180 electrical degrees.

In order to control the starting and voltage characteristics of the converter 104, I have provided a suitable phase-shifting device, such as an induction phase shifter 150, in the supply circuit 151 of the control transformer 142. For controlling the phase-shifting device 150, I have provided a variable speed control motor 152 which is supplied with direct-current energy from a suitable rectifying device 153, preferably connected to the supply leads 151 of the control transformer 142. A suitable relay 93 is provided for energizing or deenergizing the motor 152. A suitable manual device 155 is provided for controlling the speed of the operating motor 152. For purposes of illustration I have shown this operating motor 152 as having a series field 156 composed of two field windings either or both of which may be connected in circuit with the armature of the motor 152. I have also provided suitable shunt circuits 157 for reducing the armature current with respect to the current in the series field of the motor 152. Obviously, any suitable variable speed motor may be used.

The variable speed motor 152 is connected to the rotor 158 of the induction phase shifter 150 by means of a suitable clutch, illustrated as a magnetic clutch 160, supplied with direct-current by a rectifying device 161 connected across the supply circuit 151 of the control transformer 142.

I have also provided a suitable brake mechanism 163 for holding the rotor 158 in any predetermined position after it has been brought to this position by the operating motor 152, and I have provided means such as the limit switch 165 responsive to a predetermined position of the rotor 158 of the phase shifter 150 for deenergizing the operating motor 152 and the clutch 160 connecting it to the phase shifter 150. Any suitable means such as a spring or other energy storing device may be provided for restoring the rotor 158 of the phase shifter 150 to its initial position after release of the brake mechanism 163. Suitable relays are provided for controlling the operation of this control transformer and its phase-shifting device in sequence with the remaining portion of the control circuit as will be presently described.

In order to clear arc-backs or other abnormal conditions in the converter 104, it is desirable to apply a blocking potential simultaneously to all of the control electrodes 110 of the converter 104, and frequently to discontinue the normal control impulses to these electrodes. For this purpose, I have provided a biasing transformer 170 connected to the control circuit 116 by means of suitable contact devices 58X1, 58X2 operated by suitable relay trains. The secondary potential of the biasing transformer 170 is converted to uni-directional potential by means of a suitable rectifying device 171, the terminals 172—173 of which are connected in shunt with a portion of the return circuit 147 to the neutral point of the control transformer 142, so that a portion 175 of the return circuit 147 to the control transformer 142 provides a shunt around the biasing device 171. Suitable contacts 76A, 58X1 and 58X2 are provided for opening or closing the shunt circuit 175 to render the biasing potential active or inactive, as may be desired.

In order to relieve the duty on the contacts in the short-circuit or shunt circuit 175, I have provided a suitable capacitor 176 connected in shunt with the control contacts 76A, 58X1 and 58X2, and have provided a suitable ballast resistor 177 in series with this capacitor 176, so that opening and closing of the shunt circuit 175 will not impart undesirable surges to the control system.

When utilizing the control transformer 142 for distributing the biasing potential to the electrodes 110 of the converter 104, it may happen that the biasing potential will be applied at an instant when one or more of the valves 108 of the converter 104 are carrying current. This frequently results in current surges through that portion of the transformer 142 connected to the electrodes 110 controlling the current-carrying valves 108. These surges may induce undesirable voltages in certain parts of the control transformer 142 which would overbalance the biasing potential and permit one or more of the inactive anodes 108 to pick up and carry current.

In order to prevent this, I provide means for establishing a short-circuiting connection 180 across the primary windings 143 of the control transformer 142, and provide suitable relay means for disconnecting the control potential from the control transformer 142 and close the short-circuiting connections 180 around transformer 142 at the same time that the shunt circuit 175 across the biasing device 171 is opened.

The operating coil 52C for the main circuit breaker 52 in the alternating-current circuit 101 is also supplied with energy from the control circuit 116. All of the control devices are suitably interlocked by means of suitable relay trains as will presently be pointed out by a description of the operating characteristics of my control system.

The operation of my control system is as follows: The source of control potential 115 is connected to the control circuit 116 by closing the circuit breaker 8 which supplies current to the control circuit 116. When the main circuit breaker 52 is opened, the back contact 52a of circuit breaker 52 supplies potential through an insulating transformer 185 to relay 58, which closes its front contacts 58a, 58b, short circuiting the primary windings 143 of the control transformer 142 and opening its back contacts 58c, 58d which removes potential from the supply circuit 151 of the control transformer 142, thus effectively blocking any premature operation of the converter 104.

To now place the converter 104 in operation, a suitable control button 1 is closed either manually or by any suitable control circuit. Closing of this starting button 1 energizes the operating coil of relay 3 which closes its contacts 3a, short circuiting the starting button 1, thus locking itself in, and closing simultaneously a second contact 3b which supplies potential through a suitable insulating transformer 186 to relay 94, which picks up its contacts 94a, 94b and connects in the exciting transformer 135 and the supply circuit of the starting transformer 123. The supplying of energy by the closing of relay 94 to the exciting transformer 135 also supplies energy to an auxiliary relay 94X which picks up its contacts 94Xa and energizes the starting transformer 123 and contact 94Xb which closes the circuit from the starting rectifier 121 to the starting electrode 120.

The operating coil 125 will in the meantime have projected the starting electrode 120 into contact with the cathode 130 of the converter. Closing of the contact 94Xb in the starting circuit 187 of the starting electrode 120 will short circuit the operating coil 125, allowing the starting electrode 120 to retrieve and initiate the cathode spot in the converter. The starting electrode 120 sufficiently ionizes the arc space of the converter 104 to permit the keep-alive electrodes 133 to pick up and carry current.

Relay 53 in the return circuit of the keep-alive electrodes 133 will now be energized and will open its back contact 53a in series with relay 94X, which will then drop out deenergizing the starting transformer 122 and disconnecting the starting electrode 120 from the auxiliary starting rectifier 121. This is particularly advantageous in high-voltage rectifiers, as the starting electrode 130 would be normally at the potential of the converter 104, and unless the electrode 120 is disconnected from the terminals of the auxiliary starting rectifier 121, undesirable stresses may be imposed across the auxiliary rectifying device 121.

Simultaneously with the application of exciting potential to the converter 104, the relay 94 closes contact 94c and energizes the actuating coils of relays 58X1 and 58X2. Relays 58X1 and 58X2 pick up opening contacts 58X1b and 58X2b in the shunt circuit 175 of the biasing device 171 and close their front contacts 58X1a and 58X2a supplying biasing potential to the biasing transformer 170, the biasing potential of which is rectified by the auxiliary rectifying device 171. The negative potential of the rectifying device 171, because of the opening of contacts 58X1b and 58X2b, is supplied to the neutral points of the control transformer 142 and distributed by the transformer windings 144 to the control electrodes 110 of the converter 104, thus effectively blocking operation of the converter.

Simultaneously, with operation of relay 94, relay 52X is picked up, closing its front contact 52Xa in series with relay 52Y and the second front contact 52Xb in series with an auxiliary rectifying device 190 which supplies operating current to the closing coil 52C of breaker 52. The relay 52Y is a time operated relay operating latching coil for circuit breaker 52. The application of operating potential to the operating coil 52C closes in breaker 52, which locks in an auxiliary contact 52d in series with relay 52Y, which after a time interval picks up its contact 52Ya, deenergizing relay 52X which drops out a contact 52Xd in parallel with back contact 52a of the breaker 52 in series with relay 58. Relay 58 then drops out contacts 58a, 58b, removing the short circuit from the primary 143 of the operating transformer 142 and closing its contacts 58c, 58d, applying potential to the control transformer 142. Simultaneously, relays 58X1 and 58X2 drop out closing the shunt circuit 175 around the biasing device 171 and removing potential from the biasing transformer 170.

Assuming that there is no overload, or abnormal condition in the converter, relays 76 and 76A will be dropped out. Relays 76 and 76A being inoperative, potential will be applied to the control transformer 142 and the biasing transformer 170 will be inoperative. The application of control potential to the control transformer 142 energizes relay 93. Assuming that the phase shifter 150 had been properly returned to its normal inoperative position, the back contact 165a of the limit switch 165 on the phase shifter mechanism will be closed so that the relay 93 will pick up its contacts 93a, 93b and apply potential to the auxiliary rectifier 155 supplying potential to the clutch device 160 connecting the motor 152 to the rotor 158 of the induction phase shifter 130. Simultaneously, potential is applied to the auxiliary rectifier 153 supplying energy to the operating motor 152 which will operate at a speed determined by the setting of the control device 155 for the motor 152 which will rotate the rotor 158 of the phase shifter 150 through a predetermined angle determined by the limit switch 165, at which time the limit switch 165 will be closed setting the brake 163 to maintain the rotor 158 in its advanced position. The back contact 165a of the limit switch 165 will be opened deenergizing relay 93 which drops out deenergizing the motor 152 and the clutch 160 leaving the control device 150 in its normal operating position with the converter 104 carrying normal operating current.

If an overload should occur in the direct-current circuit 102 supplied by the converter 104, relay 76A will pick up its back contacts 76Aa in the shunt circuit of the biasing device 171 and closing contacts 76Ab, 76Ac in the supply circuit to the biasing device 171; so that biasing potential is applied to the control electrodes 110 of the converter 104. At the same time, relay 76A closing its contact 76Ad picks up relay 76AX which opens its back contacts 76AXa, 76AXb to deenergize the control transformer 142 and closes front contacts 76AXc, 76AXd to short circuit the primaries of the control transformer 142. Deenergization of the supply circuit 150 of the control transformer 142 releases the brake 163 on the phase shifter 150 which returns to its normal deenergized position under the influence of a suitable energy storing device. Blocking of the converter 104 will remove the overload condition so that relay 76A will drop out, closing the shunt circuit around the biasing device, removing the potential from relay 76AX, which drops out removing the short circuit from the biasing transformer and restoring potential to the control transformer, after which the phase shifter will be operated, as previously described, to advance the output potential of the converter to a predetermined amount at a predetermined time so that the converter is restored to normal operation.

In the event of a disturbance, such as an arc-back, or an overload, one or more of the relays 76 in the anode leads will be energized which will pick up its contact 76a, energizing relay 58 and relays 58X1 and 58X2, which opens the shunt circuit of the biasing device 171, closes the circuit supplying potential to the biasing transformer 170, removes potential from the operating control transformer 142, and short circuits the primary 143 of the control transformer 142. At the same time relay 76 closed contact 76b in series with relay 76X which closed contact 76Xa in series with timing relay 76Z. After the disturbance registered by relay 76 has been cleared, the back contacts 76a of relay 76 are closed, energizing relay 76Z, which after a predetermined time interval will pick up its contact 76Z, short circuiting relay 76X which opens its contacts 76Xb, 76Xc and dropping out relay 76Z and permits restarting of the converter, as previously described.

While for purposes of illustration I have described a specific embodiment of my invention, it will be apparent that changes and modifications can be made therein without departing from the true spirit of my invention or the scope of the appended claims.

I claim as my invention:

1. An electric conversion system comprising an alternating-current circuit, a direct-current circuit, a multi-valve vapor electric converter for transferring energy between said circuits, a transformer connected to said circuits and to the valves of said converter, a circuit interrupting device in said alternating-current circuit, operating means for said circuit interrupting device, a control electrode for each valve of said converter, an impulsing device having a neutral point and a plurality of phase terminals, said phase terminals being connected to said control electrodes, a rectifying device for providing a unidirectional biasing potential, a connection from the cathode of said valves through said rectifying device to the neutral point of said impulsing device, a circuit connected to said return circuit in parallel with said rectifying device, contact means for opening and closing said parallel circuit, surge preventing means connected to said parallel circuit for preventing surges upon operation of said contact means, an excitation device for exciting the valves of said converter, a source of control energy, circuits for supplying energy to said biasing rectifying device, said impulsing device and said exciting device, independent contact devices for controlling each of said circuits, a control circuit, a contact device for energizing said control device, a relay responsive to energization of said control circuit for initiating operation of the operating means for said circuit interrupting device, a second relay responsive to energization of said control circuit for operating the relay closing the supply circuit of the exciting device to excite the converter, a relay train responsive to the unclosed condition of said circuit interrupting device for energizing said biasing rectifying device and opening the parallel circuit therefor, a relay train responsive to the closing of said circuit interrupting device for deenergizing said biasing rectifying device, closing the parallel connection therefor and energizing the impulsing device.

2. A control system for a vapor electric converter having a plurality of valves comprising a control electrode for each valve of the converter, an impulsing device having an exciting winding, an impulsing winding having a neutral point and a plurality of phase terminals corresponding to the valves of the converter, connections between the several phase terminals and the respective control electrodes, a resistor in each of said connections, a return connection from the cathode of said valves to the neutral point of said impulsing device, a source of alternating-current biasing potential, a rectifying device connected to said source to provide a unidirectional biasing potential, said rectifying device being connected in series with said return circuit for impressing the biasing potential on the neutral point of said impulsing device, a shunt circuit for bypassing said rectifying device, contact means for opening and closing said shunt circuit, means for preventing surges upon operation of said contact means and relay means for controlling the energization of said source of biasing potential and said impulsing device.

3. A vapor-electric conversion system comprising an alternating-current supply circuit, a direct-current load circuit, a vapor-electric converter having a plurality of electric valves for transferring energy between said circuits, a control electrode for each valve of said converter, means for initiating a cathode spot in said converter, an impulsing transformer having primary and secondary windings, the secondary winding having a neutral point and a plurality of phase terminals corresponding to the valves of the converter, connections from the several phase terminals to the respective control electrodes, an alternating-current supply circuit for the primary of said impulsing transformer, contactors for controlling the energization of said transformer from said supply circuit, a source of unidirectional biasing potential, contactors for controlling the energizaton of said source, a connection from said source to the neutral point of the secondary of said impulsing transformer, a second connection from said source to the cathode of said converter, a short circuiting connection for said source of biasing potential, contactors for controlling said short circuiting connection, a short circuiting connection for the primary of the impulsing transformer, and a relay train responsive to a predetermined condition in said converter for energizing said source of biasing potential, opening the short circuiting connection for said source, deenergizing the impulsing transformer and closing the short circuiting connection therefor for blocking operation of said converter.

4. A control system for a vapor-electric converter comprising a circuit breaker for energizing the valves of the converter, control electrodes for the valves of the converter, means for ionizing the arc space of the converter, an impulsing transformer having primary and secondary windings, said secondary winding having phase terminals connected to said control electrode, a supply circuit for energizing the primary winding of said impulsing transformer, a biasing transformer, a supply circuit for said biasing transformer, a full-wave rectifier connected to the output side of said biasing transformer, a connection from the negative terminal of said rectifier to the secondary winding of said impulsing transformer, a connection from the positive terminal of said rectifier to the cathode of said converter, a shunt connection between the positive and negative terminals of said rectifier, contacts for opening and closing said shunt circuit, a capacitor connected in shunt with said contactors, a short circuiting connection for the primary winding of said impulsing transformer, contactors for opening and closing said short circuiting connection, contactors for opening and closing the supply circuit of said biasing and impulsing transformers, a relay system responsive to the open position of said circuit breaker to close the contactors in the supply circuit of the biasing transformer, open the contactors in the supply circuit of the impulsing transformer, open the shunt connection of the biasing rectifier and close the short circuiting connection of the impulsing transformer, said relay system being further responsive to closing of said circuit breaker to open the contacts of the supply circuit of the biasing transformer, close the contacts in the supply circuit of the impulsing transformer, close the shunt connection of the biasing rectifier and open the short circuit connection of the impulsing transformer.

5. A control system for a vapor-electric converter comprising a circuit breaker for energizing the valves of the converter, control electrodes for the valves of the converter, means for ionizing the arc space of the converter, an impulsing transformer having primary and secondary windings, said secondary winding having phase terminals connected to said control electrode, a supply circuit for energizing the primary winding of said impulsing transformer, a biasing transformer, a supply circuit for said biasing transformer, a full-wave rectifier connected to the output side of said biasing transformer, a connection from the negative terminal of said rectifier to the secondary winding of said impulsing transformer, a connection from the positive terminal of said rectifier to the cathode of said converter, a shunt connection between the positive and negative terminals of said rectifier, contacts for opening and closing said shunt circuit, a capacitor connected in shunt with said contactors, a short circuiting connection for the primary winding of said impulsing transformer, contactors for opening and closing said short circuiting connection, contactors for opening and closing the supply circuit of said biasing and impulsing transformers, a relay system responsive to the open position of said circuit breaker to close the contactors in the supply circuit of the biasing transformer, open the contactors in the supply circuit of the impulsing transformer, open the shunt connection of the biasing rectifier and close the short circuiting connection of the impulsing transformer, said relay system being further responsive to closing of said circuit breaker to open the contacts of the supply circuit of the biasing transformer, close the contacts in the supply circuit of the impulsing transformer, close the shunt connection of the biasing rectifier and open the short circuit connection of the impulsing transformer, a rotary phase shifter in the supply circuit of the impulsing transformer and means responsive to energizing the impulsing transformer for rotating said phase shifter through a predetermined angle in a predetermined time.

6. A vapor-electric conversion system comprising an alternating-current circuit, a direct-current circuit, a converter having a plurality of controlled electric valves for transferring energy between said circuits, an excitation system for said converter comprising a source of exciting potential, an exciting transformer, a full-wave rectifier connected to the output potential of said transformer, an exciting electrode in said converter, a circuit connecting said exciting electrode to said transformer, a keep-alive transformer, a plurality of keep-alive electrodes in said converter, a circuit connecting said keep-alive electrodes to said keep-alive transformer, means for energizing both said transformers, relay means responsive to flow of current in said keep-alive for deenergizing said exciting transformer, a source of unidirectional biasing potential, a source of alternating control potential, control electrodes associated with the valves of the converter, common means for applying said control potential and said biasing potential to said control electrodes and relay means responsive to the electrical condition of said converter selectively energizing said source of biasing potential and said source of alternating control potential.

7. A vapor-electric conversion system comprising an alternating-current supply circuit, a direct-current load circuit, a transformer interconnecting said circuit, a plurality of controlled electric valves for transferring energy between said circuit, a circuit breaker in said alternating-current circuit, a control electrode associated with each of said valves, a source of control potential, an impulsing transformer having its phase terminals connected to said control electrode, a circuit for connecting said impulsing transformer to said source, a biasing transformer, an auxiliary rectifier connected to said biasing transformer, a connection for impressing the biasing potential of said biasing transformer through said impulsing transformer onto said control electrodes, a circuit for connecting said biasing transformer to said source, a relay train responsive to the open condition of said circuit breaker for energizing said biasing transformer, deenergizing and short circuiting said impulsing transformer, and responsive to closing of said circuit breaker for deenergizing said biasing transformer, energizing and removing the short circuit from said impulsing transformer.

8. A vapor-electric conversion system comprising an alternating-current supply circuit, a direct-current load circuit, a transformer interconnecting said circuit, a plurality of controlled electric valves for transferring energy between said circuit, a circuit breaker in said alternating-current circuit, a control electrode associated with each of said valves, a source of control potential, an impulsing transformer having its phase terminals connected to said control electrode, a circuit for connecting said impulsing transformer to said source, a biasing transformer, an auxiliary rectifier connected to said biasing transformer, a connection for impressing the biasing potential of said biasing transformer through said impulsing transformer onto said control electrodes, a circuit for connecting said biasing transformer to said source, a relay train responsive to the open condition of said circuit breaker for energizing said biasing transformer, deenergizing and short circuiting said impulsing transformer, responsive to closing of said circuit breaker for deenergizing said biasing transformer, energizing and removing the short circuit from said impulsing transformer, and a second relay train responsive to abnormal current conditions in said valves for energizing said biasing transformer and deenergizing and short circuiting said impulsing transformer, said second relay train being automatically resetting after a predetermined time interval.

9. A vapor-electric conversion system comprising an alternating-current supply circuit, a direct-current load circuit, a double-six-phase transformer interconnecting said circuits, a converter having twelve electric valves connected to said transformer and said direct-current circuit for controlling the flow of current therebetween, a switching device for connecting said transformer to said alternating-current circuit, a source of control potential for said conversion system, an excitation device connected to said source for initiating and maintaining a cathode spot in said converter, a biasing transformer, an auxiliary rectifier device connected to said biasing transformer, connections between said biasing transformer and said source of control potential, a contactor in said connections, a relay responsive to the position of said switching device for controlling said contactor, an impulsing transformer, connections for supplying energy from said source to said impulsing transformer, control electrodes associated respectively with the valves of the converter, connections from the terminals of said impulsing transformer to said electrodes, connections for impressing the rectified potential of said biasing transformer through the impulsing transformer for blocking operation of the converter and means responsive to closing said switching device for rendering said biasing transformer inactive and rendering said impulsing transformer active.

10. A vapor-electric conversion system, comprising a polyphase alternating-current supply circuit, a direct-current load circuit, a converter having twelve effective valves, a transformer having twelve secondary phases connected to the valves of said converter, a switching device for connecting said transformer to said alternating-current circuit, an operating transformer connected to said alternating-current circuit, a control electrode associated with each valve of said converter, a twelve-phase impulsing transformer for supplying control impulses to said control electrode, means for connecting said impulsing transformer to said operating transformer, a phase-shifting device in said connecting means, means for operating said phase-shifting means in response to energization of the impulsing transformer to shift the phase of the impulsing transformer through a predetermined angle in a predetermined time interval, means responsive to operation of the phase-shifting device for disconnecting said operating means and lock the phase-shifting device, a source of biasing potential connected to the secondary of said impulsing transformer, means for maintaining said biasing source inactive and means responsive to abnormal current conditions in said converter for activating said biasing source and deenergizing said impulsing transformer.

11. An electric current converting system comprising an alternating-current supply circuit, a direct-current load circuit, a vapor-electric converter having twelve valves, a transformer, two parallel primary windings in said transformer, one of said windings being connected in delta and the other in Y, two six-phase diametrical secondary windings having their phase terminals connected to the valves of said converter, said secondary windings being substantially independent and associated respectively with said primary windings whereby the phase relation of said secondary windings is displaced to provide twelve-phase operation of said converter, means for connecting said transformer to said supply circuit, a source of control potential for said converter, means for exciting said converter from said source, control electrodes associated respectively with each valve of said converter, a transformer for supplying control potential to said electrodes, means for supplying blocking potential to said electrodes, said transformer and blocking means being interconnected so that the transformer is ineffective when the blocking means is energized.

HERBERT A. ROSE.